United States Patent [19]

Cowan

[11] Patent Number: 5,499,677
[45] Date of Patent: Mar. 19, 1996

[54] EMULSION IN BLAST FURNACE SLAG MUD SOLIDIFICATION

[75] Inventor: Kenneth M. Cowan, Sugar Land, Tex.

[73] Assignee: Shell Oil Company, Houston, Tex.

[21] Appl. No.: 372,803

[22] Filed: Dec. 23, 1994

[51] Int. Cl.$^6$ ............................................. F21B 33/138
[52] U.S. Cl. ............................................. 166/293; 106/790
[58] Field of Search ............................................. 166/292, 293; 106/790

[56] References Cited

U.S. PATENT DOCUMENTS

| | | | |
|---|---|---|---|
| 3,499,491 | 3/1970 | Wyant et al. | 166/292 |
| 3,557,876 | 1/1971 | Tragesser | 166/292 |
| 5,016,711 | 5/1991 | Cowan | 166/250 |
| 5,020,598 | 6/1991 | Cowan et al. | 166/293 |
| 5,058,679 | 10/1991 | Hale et al. | 166/293 |
| 5,213,160 | 5/1993 | Nahm et al. | 166/293 |
| 5,314,022 | 5/1994 | Cowan et al. | 166/293 |
| 5,322,124 | 6/1994 | Cowan et al. | 166/293 X |
| 5,379,843 | 1/1995 | Unger et al. | 166/293 X |

*Primary Examiner*—George A. Suchfield

[57] ABSTRACT

A cementitious slurry is prepared from drilling fluid, blast furnace slag and an emulsion comprising an oil external phase and an aqueous internal phase having therein a additive for said cementitious slurry. In a preferred embodiment the additive is an accelerator for the blast furnace slag such as sodium hydroxide. This allows mixing the additive with the drilling fluid and blast furnace slag without immediate contact between the additive and the other ingredients. After the cementitious slurry has been mixed and pumped into position in a wellbore, the emulsion breaks and the additives are released.

1 Claim, No Drawings

EMULSION IN BLAST FURNACE SLAG MUD SOLIDIFICATION

BACKGROUND OF THE INVENTION

This invention relates to drilling fluid solidification.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to fill the annulus between the casing and the borehole wall or between the liner and casing with a material which will seal the annulus (interfacial sealing) to inhibit communication between various formations penetrated by the wellbore and which will provide structural support for the casing or liner. This is commonly referred to as primary cementing.

Generally, the borehole into which the casing or liner is introduced is filled with drilling mud. Conventional Portland cement and conventional drilling muds are incompatible. Thus, a mixture of conventional Portland cement and conventional drilling mud will not set up into a strong cement. In addition, the viscosity of such mixtures becomes uncontrollable and may either become too viscous to pump or may get thinner.

At the completion of drilling, the used drilling fluid is displaced from the borehole using some means to keep it separate from the cement to follow. This creates two problems. First, the means developed by the industry to keep the drilling fluid separate is relatively complex, involving the use of a landing collar and a pair of wiper plugs. In addition, the thus-displaced drilling fluid must be disposed of Wyant et al, U.S. Pat. No. 3,499,491 (Mar. 10, 1970) proposed a partial solution to this problem by mixing a cementitious material such as Portland cement with powdered sodium silicate glass and a treated drilling fluid. While this does solve the problem of drilling fluid disposal since the drilling fluid is incorporated into the cement, it necessitates the use of extraneous components in order to achieve a sufficient degree of compatibility to make the cement work at all.

Thus, almost a century after oil well cementing began, the problem of incompatibility between Portland cement and ordinary aqueous drilling fluids still precludes significant commercial use of used drilling fluid to produce cementitious slurries from Portland cement.

Tragesser, U.S. Pat. No. 3,557,876 (Jan. 26, 1971), refers to drilling fluids containing pozzolans although no working examples are given.

Hale and Cowan, U.S. Pat. No. 5,058,679 (Oct. 22, 1991), disclose solidifying drilling fluid by admixing blast furnace slag with the drilling fluid. Blast furnace slag is compatible with drilling fluids and thus the cement resulting from the combination of blast furnace slag and drilling fluid has good strength characteristics. Moreover, such cement provides outstanding properties of the type which are significant to wellbore cementing such as interfacial sealing.

It would, however, be desirable in some instances to enhance the rheological properties and to more precisely control the set time.

SUMMARY OF THE INVENTION

It is an object of this invention to solidify an aqueous drilling fluid with blast furnace slag.

It is a further object of this invention to enhance rheological properties of a cementitious slurry made from used aqueous drilling fluid and blast furnace slag.

It is yet a further object of this invention to improve control over set time of a cementitious slurry made from blast furnace slag and aqueous drilling fluid.

In accordance with this invention a cementitious slurry is prepared from ingredients comprising blast furnace slag, an aqueous drilling fluid, and an emulsion comprising a continuous oil phase and an internal aqueous phase containing an additive for said slurry.

DETAILED DESCRIPTION OF THE INVENTION

It has been found that the rheological properties and/or set time control of blast furnace slag/drilling fluid cementitious slurries can be enhanced if additives such as sodium hydroxide are introduced in the form of an oil continuous phase emulsion wherein the additive is in an internal aqueous phase.

DEFINITIONS

By "cementitious slurry" is meant a slurry comprising blast furnace slag and aqueous drilling fluid.

By "direct fluid contact" between a displacement fluid and the cementitious slurry is meant that the displacement fluid directly contacts the upper surface of the column of cementitious slurry as opposed to having a solid wiper plug and/or spacer fluid disposed between the cementitious slurry and the displacement fluid. By "direct fluid contact" between the cementitious slurry and the drilling fluid or mud is meant that the cementitious slurry directly contacts the upper surface of the column of drilling fluid or mud as opposed to having a wiper plug with a rupturable diaphragm and/or spacer fluid disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

By "barrel" is meant a standard 42-gallon petroleum barrel.

EMULSION

By "oil" is meant any normally liquid water-insoluble hydrocarbon. Suitable oils include diesel oil, crude oil, vegetable oil, fish oil, mineral oil and synthetic oil polyalpha-olefins such as sheen-free synthetic oil sold by MI Drilling Fluids under the trade name "NOVASOL", and ethers such as the "AQUAMUL 82" ether sold by Anchor Drilling Fluids Inc. as part of the "AQUAMUL II" System.

The aqueous internal phase comprises water and at least one additive. Frequently, in addition to the additive, the internal aqueous phase will contain a salt. Various salts, including organic salts, are suitable for use in the aqueous phase of this emulsion including, but not limited to, NaCl, NaBr, CaCl, CaCl$_2$, NaNO$_3$, NaC$_2$H$_3$O$_2$, KaC$_2$H$_3$O$_2$, NaCHO$_2$, CsCHO$_2$ and KCHO$_2$. Sodium chloride is usually preferred. These salts can be used, if desired, from 0.1 wt % up to the saturation point under the conditions employed. One option is to simply utilize seawater. In the case of sodium chloride, the concentration can be from 0.1 to 26 wt %, preferably 3 to 20 wt %, based on the weight of the water in the internal phase. In some instances, 5 to 20 wt % may be preferred.

The additive can be any water-soluble or water-dispersable material which is an ingredient of blast furnace slag cementitious slurries. For the most part, however, the additive will be an accelerator or combination of ingredients which act as an activator system.

When a cementitious slurry is made from drilling fluid it is generally desirable to reduce the viscosity to compensate for the incorporation of the blast furnace slag into the drilling fluid. This is all the more so because some additives, such as sodium hydroxide accelerator, tend to flocculate clays normally present in the drilling fluid which increases the viscosity. Accordingly, the invention allows keeping the additive which will increase viscosity isolated from the other ingredients of the cementitious slurry during the above-ground mixing and pumping of the cementitious slurry into the borehole. Also, where the additive is being incorporated into the emulsion is an activator, the invention allows greater control over set times since the cementitious slurry can be mixed above ground and pumped into place prior to the time the activator comes into effective contact with the blast furnace slag to accelerate hydration. In this case, the additive can be any activator whether or not it tends to flocculate.

Activators which can be incorporated via the emulsion in accordance with this invention include, in addition to sodium hydroxide, the following: lithium hydroxide, lithium carbonate, sodium silicate, sodium fluoride, sodium silicofluoride, magnesium hydroxide, magnesium oxide, magnesium silicofluoride, zinc carbonate, sodium bicarbonate, titanium carbonate, potassium carbonate, potassium bicarbonate, potassium hydroxide, potassium sulfate, potassium nitrite, potassium nitrate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone.

The emulsion is prepared utilizing a conventional surfactant. Generally surfactants of the type suitable for forming water-in-oil emulsion are used. These can be surfactants of numerous types but according to HLB theory, the preference surfactants should have an HLB between about 1 and 8, more preferably between 2 and 7 and most preferably between 3 and 6. HLB refers to Hydrophilic/Lipophilic Balance. Blends of surfactants can be used and one or more of the surfactants may have an HLB number greater than (or outside of) the broadest preferred range. However, the mixture of surfactants should have an HLB number for the blend within the preferred range(s) to provide a stable water-in-oil emulsion. There are thousands of surfactants available and the user may choose suitable surfactants from a compendium such as McCutcheon's. The surfactant can be used in an amount within the range of about 0.001 to 10, preferably 0.01 to 8, more preferably 0.1 to 5 wt % based on the weight of water in the aqueous phase of the emulsions.

The following surfactants or families of surfactants are suitable for use with the invention: block copolymers of propylene oxide and ethylene oxide, ethoxylated polyoxypropylene glycol, sorbitan fatty ester, ethoxylated alkyl phenol (nonyl), glycerol mono/di/tristearate, glycerol monooleate, glycerol oleate, nonylphenol ethoxylate, octyl phenylethoxylate, "PEG-100" (polyethylene glycol from Union Garbide) oleate glyceryl stearate, $C_{12}$–$C_{13}$ linear primary alcohol ethoxylate, natural lecithin, primary alcohol ethoxylate, sorbitan monotallate, diethylene glycol mono-tallowate, ethoxylated fatty amine, "POE-2" (polyoxyethylene from Dupont) oleyl ether, "POE-2" stearyl ether, methyl glucoside dioleate, PEG (4) dilaurate, ethoxylated linear alcohols (3 E.O.), alkoxylated glycols, $C_{14}$–$C_{15}$ linear primary alcohol ethoxylate, silicone glycol copolymers, "PEG-400" dioleate, "PEG-400" distearate, "PEG 300" distearate, "PEG-200" dilaurate, primary alcohol ethoxylate, $C_{11}$–$C_{15}$ secondary alcohol ethoxylate, quaternary ammonium chloride, "PEG 400" dilallate, triglycerol monolcate. The following surfactant types by functional groups are generally acceptable: alkanolamides, alkylaryl sulfonates, amine acetates, amine oxides, sulfonated amines, sulfonated amides, betaine derivatives, block polymers, block copolymers, carbonated alcohol ethoxylates, diphenyl sulfonate derivatives, ethoxylated alcohols, ethoxylated alkylphenols, ethoxylated amines and/or amides, ethoxylated fatty acids, ethoxylated fatty esters and oils, fatty esters, fluorocarbon-based surfactants, glycerol esters, glycol esters, imidazolines and imadazoline derivatives, lecithin and lecithin derivatives, lignin and lignin derivatives, monoglycerides and derivatives, olefin sulfonates (AOS), phosphate esters, propoxylated and ethoxylated fatty acids, alcohol or alkyl phenols, quaternary surfactants, silicon-based surfactants, sorbitan-derivatives, sulfates and sulfonates of ethoxylated alkylphenols, sulfates and sulfonates of oils and fatty acids, sulfates and alcohols, sulfates of ethoxylated alcohols, sulfates of fatty esters, sulfonates of benzene, toluene and xylene, sulfonates of condensed naphthalenes, sulfonates of dedecyl and tridecylbenzenes, sulfonates of naphthalene and alkyl naphthalene, sulfonates of petroleum, sulfosuccinamates and derivatives, taurates, tridecyl and dodecyl benzene sulfonic acids.

The emulsions are easier to prepare if the water internal phase is relatively smaller compared with the continuous oil external phase. Consequently, while any ratio of water-to-oil that will produce an oil external aqueous emulsion is satisfactory, it is preferred to utilize about 50 wt % or less of the aqueous phase based on the total weight of aqueous phase and oil phase. Compositions containing 5 to 50 wt % aqueous phase are particularly suitable. The concentration of the additive in the aqueous phase is generally as high as it is feasible to have it, i.e., up to the saturation point. Since most of the accelerators are relatively soluble in water, it is generally feasible to utilize from 5 to 100, preferably 25 to 70, more preferably 10 to 50 wt % additive based on the weight of the water.

Sodium hydroxide is 42% by weight soluble in 32° F. water and 347% by weight soluble in boiling water.

Sodium carbonate is 7.1% by weight soluble in 32° F. water and 45.5% soluble in boiling water.

Sodium citrate is 72% by weight soluble at 68° F. water, and 168% soluble in boiling water (212° F.).

AQUEOUS DRILLING FLUID

The aqueous drilling fluid can be either a high water content water external oil emulsion or an aqueous drilling fluid containing essentially no oil, with the latter being preferred. The drilling fluid serves primarily to provide the water for the cementitious slurry. However, as a secondary matter, the drilling fluid contains solids and thus provides solids for the ultimate cementitious slurry. The drilling fluid can contain any of the additives normally associated with aqueous drilling fluids such as fluid loss additives, rheology control agents (viscosifiers), weight materials, shale stabilizers and deflocculants. Almost always the aqueous drilling fluids contain clay. The clay may be a part of the drill solids produced during drilling. Additionally, a clay such as prehydrated bentonire may be present as a fluid loss control agent.

Suitable deflocculants include carboxylate polymers such as water soluble carbohydrate polymers manufactured by Grain Processing Company under the trade name "MOR-REX".

Suitable fluid loss additives found in drilling fluids include in addition to bentonire clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, illmentite, and hematite, for example. Shale stabilizers that are used in drilling fluids include hydrolyzed polyacrylonitrile, partially hydrolyzed polyacrylamide, salts, polyethers and/or polyalcohols. Salts can be of the same scope and amount as those set out for the aqueous phase of the emulsion. As with the aqueous phase for the emulsion, seawater can be used. Thus, the water for the drilling fluid can simply be seawater. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illire, chlorite, kaolinire, etc.) may be found in a typical mud.

Suitable polyalcohols are disclosed in Cowan and Hale, U.S. Pat. No. 5,020,598 (Jun. 4, 1991), the disclosure of which is hereby incorporated by reference. In addition, the Hale and Cowan patent, U.S. Pat. No. 5,058,679 (Oct. 22, 1991), the disclosure of which is incorporated herein by reference, also describes suitable polyalcohols and further describes types of drilling fluids which can be solidified with blast furnace slag. If a polyalcohol is used, it may be desirable in some instances to use one modified with an epoxy resin.

The epoxy resin can be used in an amount sufficient to give 0.5 to 5 wt % material from the epoxy resin incorporated in the epoxy polyethercyclicpolyol. Alternatively, a relatively high epoxy content can be utilized, say 6 to 75, preferably 20 to 45 wt %. Thus, viewed in terms of the polyol, the epoxy component content can vary from 0 to 67 wt % based on the total weight of the polyol.

The initial pressure can be higher when making the higher epoxy material as compared with the initial pressure preferred for the polyetherpolyols in general as disclosed in said Hale and Cowan patent. For instance, the initial pressure can be greater than 180 torr. Generally, the initial pressure will be between 250 and 500, preferably 250–350 torr, i.e., a vacuum, when the starting polyhydric alcohol component is glycerine. If desired, the reaction can be terminated before 1.107 moles of water per mole of polyol reactant are removed. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy-containing materials are being produced, more additions are utilized and the addition of the epoxy could be continuous. With the high epoxy content materials diglycidyl ethers are preferred instead of the tri- and tetraglycidyl ethers.

Another class of polyalcohols is ethoxylated propoxylated alcohols of the following general formula

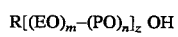

$R[(EO)_m–(PO)_n]_z OH$ where EO=an ethoxy unit
PO=a propoxy unit
R=an alkyl chain of 2–16 carbon atoms, preferably 3–16, most preferably 4–10 carbon atoms. At least one of m or n is greater than zero. In these EO/PO copolymers, m and n are variable and the sum of m plus n determines their number average molecular weight, which ranges from 500 to 15,000, preferably from 600 to 10,000. Mixtures of water soluble and water insoluble alcohols can be used because of the improved interfacial sealing and reduced fluid loss which the combination provides.

The density will vary depending on the density needed for the particular drilling operation being carried out and may range anywhere from about 8.5 to about 20 lbs/barrel, but generally will be in the range of 11 to 15 lbs/barrel.

BLAST FURNACE SLAG

Blast furnace slag serves in the cementitious slurry as the cementitious constituent.

By "blast furnace slag" is meant the hydraulic refuse from the melting of metals or reduction of ores in a furnace. Such material is disclosed in the Hale and Cowan patent, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 cm$^2$/g and 15,000 cm$^2$ g, even more preferably, between 4,000 cm$^2$/g and 9,000 cm$^2$g, most preferably between 4,000 cm$^2$/g and 8,500 cm$^2$/g. An available blast furnace slag which fulfills these requirements is marketed under the trade name "NEWCEM" by the Blue Circle Cement Company. This slag is obtained form the Bethlehem Steel Corporation blast furnace at Sparrows Point, MD.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 014 2. A typical specific example is: $SiO_2$, 36.4; $Al_2O_3$, 16.0; CaO, 43.3; MgO, 3.5; iron oxides, 0.3; S, 0.5; and manganese oxides, <0.1.

Blast furnace slag having relatively small particle size is frequently desirable when used to form the cementitious slurry because of the greater strength it imparts in many instances to a final cement.

Characterized in terms of particle size the term "fine" can be used to describe particles with a Blaine specific surface area in the range of 4,000 to 7,000 cm$^2$/g, corresponding to 16 to 31 microns in size and "ultrafine" can be used to describe particles with a Blain specific surface area over 10,000 cm$^2$/g that correspond to particles 5.5 microns and smaller in size. Small particle size blast furnace slags are available from Blue Circle Cement Company, Koch Minerals, Wichita, Kan., under the trade name "WELL-CEM", and from Geochem under the trade name "MICROFINE MC100".

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

A blast furnace slag having a polydispersed particle size distribution exhibiting at least two nodes on a plot of particle size versus percent of particles in that size can be utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt %, can be ground to the ultrafine particle size and the remainder ground in a normal way thus giving particles generally in a size range of greater than 11 microns, the majority being in the 11 to 31 micron range.

In some instances, it may be desirable in the final cementitious slurry to use a mixture of the blast furnace slag and Portland cement. If such additional component is incorporated into the drilling fluid to produce the cementitious slurry, it can be incorporated in an amount within the range of 1 to 100 wt % of the weight of the blast furnace slag in the cementitious slurry, preferably 10 to 99 wt %, more preferably 15 to 50 wt %. That is, at 100 wt %, the weight ratio would be 1:1. The basis here is the total blast furnace slag actually in the cementitious slurry, including that carried over from the drilling operation and any added along with the activator. The Portland cement can act as a portion of the activator system for the blast furnace slag.

RATIO OF COMPONENTS

Blast furnace slag is utilized in an amount sufficient to give about 20 to 600, preferably 100 to 500, more preferably 150 to 300 lbs of blast furnace slag per barrel of cementitious slurry, including the emulsion (lbs/bbl).

The ratio of emulsion to blast furnace slag plus drilling fluid is generally such that the emulsion constitutes no more than 35 volume percent of the final cementitious slurry, preferably 1–20 volume percent, more preferably 10–15 volume percent. There are two considerations. First, the amount of emulsion to be utilized should be the amount to give the desired amount of additive. In the case of an activator system, generally 2 to 70 lbs of total activator is used per barrel of final cementitious slurry. In one embodiment the activator system is a mixture of caustic soda and soda ash. These ingredients are generally used in an amount within the range of 1 to 20 lbs/bbl of caustic soda, more preferably 2 to 6 lbs/bbl, in conjunction with 2 to 50 lbs/bbl, preferably 2 to 20 lbs/bbl of soda ash. Again, these amounts refer to pounds per barrel of cementitious slurry including the emulsion.

Other additives may be present in addition to or instead of the activator in amounts within the range of 1 to 100 lbs/bbl of final cementitious slurry.

The second consideration is the amount of oil in the final cementitious slurry. Some oil is marginally beneficial to the final cement; however, an excess of oil can create permeability which is disadvantageous in cementing areas traversing zones of high formation gas pressure. However, so long as the total amount of emulsion in the final cementitious slurry is within the ranges set out hereinabove, the final cement is especially impervious, exhibiting better barrier properties than conventional Portland cement, for instance.

It is highly preferred that the electrolyte concentration in the aqueous phase of the emulsion be greater than the electrolyte concentration in the drilling fluid. In this way, as the drilling fluid, blast furnace slag, and emulsion are combined, the additive is initially kept separate from the other ingredients, giving the advantages in rheology and set control noted hereinabove. After the material has been mixed and pumped, water migrates across the oil which, in effect, is a semi-permeable membrane, from the area of low water concentration in the drilling fluid to the area of high water concentration in the internal phase of the emulsion thus gradually breaking the emulsion and releasing the additive. The blast furnace slag crystals hydrate, accelerated by the presence of the activator, to form calcium silicate hydrate crystals. The calcium silicate hydrate crystals grow and extend through the released oil, link together and form a competent set cement structure.

If desired, a surfactant can be used to improve the bonding of the cement. Suitable surfactants are disclosed in Cowan, U.S. Pat. No. 5,016,711 (May 21, 1991), the disclosure of which is incorporated herein by reference.

In addition to improving bonding, a surfactant may be included in the final cementitious slurry for the purpose of stabilizing the water-in-oil emulsion in the aqueous cementitious slurry. This would create a double emulsion, i.e., multiple emulsion (like a balloon inside a balloon). Over time, the emulsions successively would break and release the additive. Of course, breaking of the emulsion or emulsions is encouraged by higher temperatures and as a general proposition, higher temperatures are found in the wellbore. Such surfactants, if used, would generally be present in an amount within the range of 0.001 to 10, preferably 0.01 to 8, more preferably 0.1 to 5 wt % based on the weight of the water in the cementitious slurry, exclusive of the water in the emulsion.

DISPLACEMENT

While conventional displacement techniques can be used to displace the drilling fluid, because of this compatibility factor, wiper plugs and spacer fluids can be omitted. Thus, the cementitious slurry can be placed in direct fluid contact with the drilling fluid and the drilling fluid displaced out of the annulus between a pipe being cemented and a surrounding wall. The cementitious slurry, then, in turn, can be displaced to a preselected location in the annulus by direct fluid contact with the displacement fluid such as seawater or additional drilling fluid.

EXAMPLE

A solution containing 50% sodium hydroxide by wt was prepared by adding 250 grams of reagent grade sodium hydroxide to 500 grams of distilled water.

A water-in-oil emulsion was prepared using light mineral oil, grade 9NF, and the 50% caustic solution. A mixture of 1% "NEODOL 23-1" (ethoxylated linear alcohol from Shell Chemical Co.,) and 1% "PLURONIC 2-61" surfactants (both by volume of the oil) were mixed into the oil while stirring. The sodium hydroxide solution was added slowly while stirring until a milky white oil external phase emulsion formed. A total of 350 mls of oil and 150 mls of the sodium hydroxide solution were used to form a 70:30 (volume of oil:volume sodium hydroxide solution) emulsion. Each milliliter of the emulsion contained 0.2 grams sodium hydroxide.

Effect on Bentonite Slurry

Five mls (a gram of sodium hydroxide) of the emulsion was added to 150 mls of a 20 lb/bbl bentonits (prehydrated) slurry. Rheological properties of this mixture were compared to the addition of 5 mls of a 20% sodium hydroxide (by wt) in water solution added to a similar volume of the same 20 lb/bbl bentonite slurry. Addition of the aqueous sodium hydroxide solution produced immediate flocculation of the bentonite and an unpourable mass resulted after 1 to 2 minutes of gentle stirring with a spatula. In contrast, the addition of the emulsion did not produce an immediate flocculation of the bentonite. Eventually the emulsion began to invert and allow the sodium hydroxide to contact the clays. An unpourable mass was formed after 10-12 minutes of gentle stirring with a spatula.

Effect on Compressive Strength Development

A slurry of "NEWCEM" (blast furnace slag from Blue Circle Atlantic Co.) ground, granulated blast furnace slag was prepared by adding 800 grams of slag to 400 grams of distilled water. This slurry was split into two equal volumes of about 250 mls each. Fifty mls of the emulsion was added to one volume. This was equivalent to 10 grams of sodium hydroxide added to the slurry. Ten grams of caustic was dissolved in 50 mls of distilled water and this solution was added to the second volume of the slag slurry. Both slurries were placed in a preheated UCA vessel at 100° F. and compressive strength was monitored over time.

| | Compressive Strength at 100° F. | |
|---|---|---|
| Time, hrs | Sodium Hydroxide Solution | Emulsion |
| 0.5 | 63 | 20 |
| 1.0 | 212 | 49 |
| 2 | 300 | 75 |
| 68 | 465 | 380 |

While this invention has been described in detail for the purpose of illustration, it is not to be construed or limited thereby but is intended to cover all changes and modifications within the spirit and scope thereof.

What is claimed is:

1. A method for solidifying a drilling fluid in a wellbore comprising:
   (a) forming a cementitious slurry by mixing components comprising:
       (1) blast furnace slag;
       (2) drilling fluid; and
       (3) an emulsion having an oil external phase and an aqueous internal phase, said internal phase comprising water and an additive for said cementitious slurry;
   (b) displacing said cementitious slurry into said wellbore; and
   (c) allowing said cementitious slurry to solidify in situ.

* * * * *